June 13, 1961 L. G. WINN 2,987,980
VENTILATION SYSTEM FOR AUTOMOBILES
Filed June 11, 1958 2 Sheets-Sheet 1

INVENTOR

LLOYD G. WINN

By Frederick C. Bromley
ATTY.

June 13, 1961 L. G. WINN 2,987,980
VENTILATION SYSTEM FOR AUTOMOBILES
Filed June 11, 1958 2 Sheets-Sheet 2
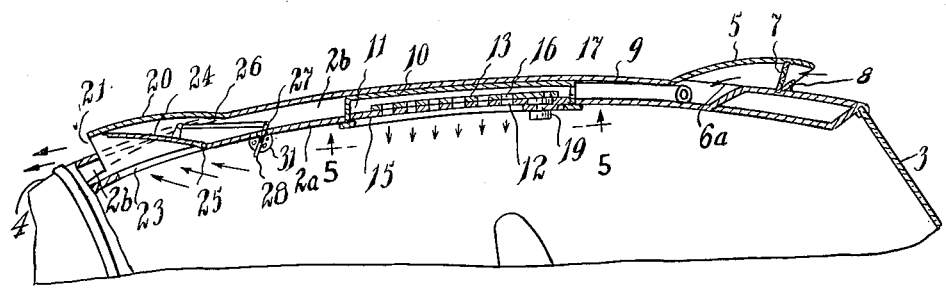
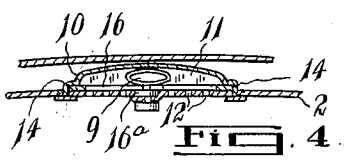
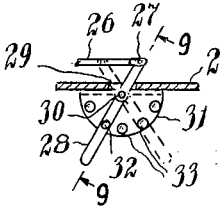
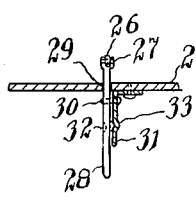
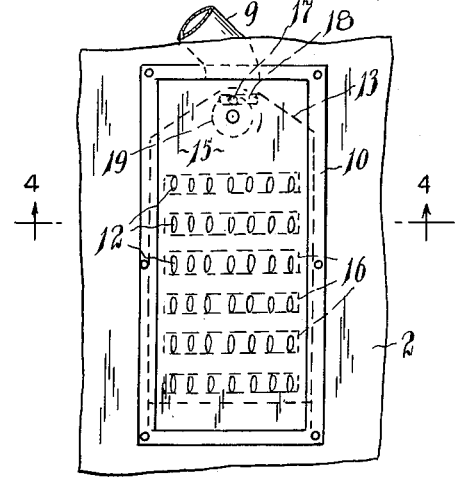
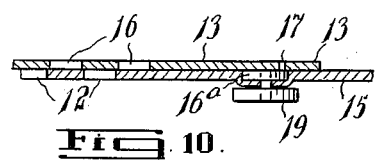
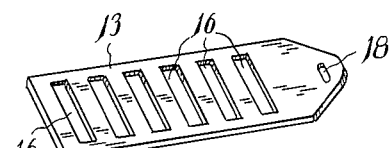
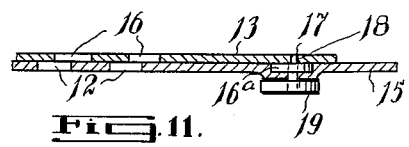
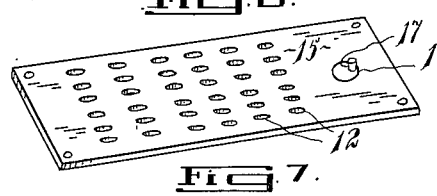
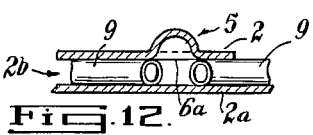
INVENTOR
LLOYD G. WINN
By Frederick C. Bromley
ATTY.

United States Patent Office 2,987,980
Patented June 13, 1961

1

2,987,980
VENTILATION SYSTEM FOR AUTOMOBILES
Lloyd G. Winn, 4 Community Circle, Willowdale, Ontario, Canada, assignor of one-third to Ralph Parkinson, Toronto, Ontario, Canada
Filed June 11, 1958, Ser. No. 741,392
2 Claims. (Cl. 98—2)

My invention relates generally to ventilating systems for automobiles and in particular to an improved system for ventilating an enclosed body of an automobile. It is highly desirable to provide a ventilation system for an automobile whereby the interior of the vehicle may be maintained in a uniform ventilated condition, regardless of outside temperatures and weather conditions. According to my invention, there is provided a ventilating system which introduces fresh air into the vehicle, desirably at a forward location and provides for downward distribution of introduced air in a regulable amount, and, at the same time, incorporates a means of discharging vitiated air at a rearward location whereby the interior of a motor car may be maintained in a ventilated condition as desired by the occupants.

The invention further contemplates a ventilating system which is available to circulate air in the space between roof and ceiling walls of vehicle tops whereby to cool said walls; and which also provide a passenger compartment-supplying air distributor which may also serve as a spacer for said roof and ceiling walls.

A further distinctive feature of the invention resides in the provision of an air scoop preferably forwardly disposed on the roof portion of a vehicle and providing an inflow passage for air which is filtered and conducted by suitable ducts to a distributor for discharge of the air into the interior of the vehicle. A still further feature of the invention resides in the novel construction and arrangement of the distributor which supplies a shallow chamber implanted in the roof portion of the vehicle with openings leading to the interior thereof and controlled by a slide plate which can be moved between open and closed positions as by a knob or other manipulating facility. Still another feature resides in the provision of the discharge means for vitiated air which is in the form of a hood at the rear of the roof by preference and which incorporates a damper for control of the passage, through which air is discharged exteriorly of the enclosed body of the vehicle.

More than one of the distributors may be employed and these may be located at suitable places with regard to the enclosing walls of the vehicle. More than one air scoop may be utilized, however, a single air scoop on the roof in the vicinity of the windshield is believed to be quite adequate and where more than one distributor is used these may be supplied with introduced air by means of ducts.

The invention comprises the novel construction and arrangement of parts as described in the ensuing specification and shown in the accompanying drawings, which depict an exemplary embodiment of the invention.

In the drawings,

FIG. 3 is a fragmentary longitudinal sectional view of the motor car depicting the roof portion;

FIG. 4 is a cross section on line 4—4 of FIG. 5;

FIG. 5 is a fragmentary view of the roof taken on line 5—5 of FIG. 3 and looking upwardly in the direction of the arrows to illustrate one of the distributors;

FIG. 6 is a perspective view of the slide plate which controls the flow of air from the distributor;

FIG. 7 is a perspective view of a bottom perforated panel wall of the distributor showing the openings therein which are controlled by the slide plate;

FIG. 8 is a sectional detail illustrating manual control for the damper in the rear hood;

FIG. 9 is a cross section on line 9—9 of FIG. 8;

FIG. 10 is a fragmentary longitudinal sectional view showing the slide plate and the manual control for the movement thereof;

FIG. 11 is a similar sectional view of the slide plate but showing it in a different position to that of FIG. 10; and FIG. 12 is a sectional detail taken on the line 12—12 of FIG. 2.

Figure 1:
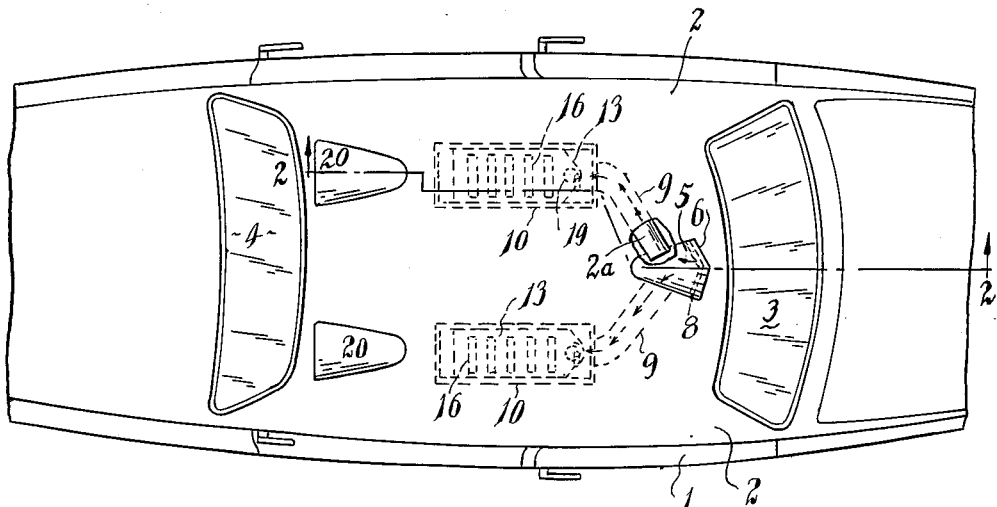
FIG. 1 is a top plan view of an automobile of the passenger type in which the present invention is incorporated in the roof thereof.

Now, referring to the drawings, by reference characters there is depicted a conventional automobile of the passenger type having a body generally denoted at 1 supplied with a top of the ordinary hollow type providing transversely spaced roof and ceiling walls 2, 2a, respectively, and which extends from the windshield 3 to the rear window 4. The roof and ceiling walls 2, 2a of the top may be rigidly connected to and supported by the side walls of the car in any desired way.

In carrying out my invention there is provided an air scoop 5 desirably extending, as a functionally integral upward bulge, from the roof wall 2 near the windshield 3 and above the roof wall-provided air inlet opening 6a. Only one air scoop is shown but it will be understood that the invention is not limited in this respect.

This frontal scoop 5 has a low wide mouth denoted at 6 and supplies a forwardly facing introductory scoop inlet opening 6 for admitting ambient air. The opening is preferably supplied with a filter of an approved type indicated at 7 and at the lower part of the opening 6 it is desirable to supply a curb wall 8 for a deflection of water away from the opening so that in case of rain, water will not enter the opening but will be caused to flow laterally of the scoop 5. The interior of the scoop is receptive to admitted air and has, as a rearwardly disposed outlet, the aforementioned roof wall-provided air inlet opening 6a which in the present instance, communicates with the laterally spaced and inwardly inclined inlet ends of two ducts denoted at 9, 9. The ducts 9, 9 which are located in air space 2b between the roof and ceiling walls 2, 2a are laterally directed and connected to the forward ends respectively of two similar distributors 10, 10 which act as spacers between the roof and ceiling walls of the top 2.

As will be seen from an inspection of FIGURE 1 the scoop 5 is widest at its forward end and converges rearwardly to present a streamlined effect. It curves downwardly and rearwardly to meet the roof wall 2 and the ducts 9, 9, are as above mentioned implanted in air space 2b of the roof that may be defined by roof and ceiling walls 2, 2a of an approved material such as plastic which will not give rise to undesirable noise when properly installed.

Since the distributors are of identical construction a description of one will suffice. It is a shallow elongated member which may be made of metal but preferably will be of a suitable plastic material having enclosing walls defining a chamber denoted at 11. The front end wall is pierced to provide an opening to receive air from the respective duct 9.

The enclosing bottom wall of the distributor is in the form of a perforated plate and the perforations therein provide distributed discharge openings for disgorging air at the inner side of the roof element whereby air is introduced into the body of the vehicle. The openings, denoted at 12, are shown as arranged in a succession of transverse rows and the rows are equidistantly spaced apart. Each perforation is desirably in the form of an elongated aperture and the space between adjacent rows is about equal to the length of the apertures.

A control plate indicated at 13 is employed for covering and uncovering the openings 12 and by the use of this plate the openings may be partially or wholly closed. The plate has its side edges engaged in guide grooves 14— see FIGURE 4—whereby it is guidedly constrained to a longitudinal slide movement. The plate is shown as disposed at the immediate inner side of the bottom wall of the distributor which bottom wall is denoted at 15 and is shown as having its outer face substantially flush with the ceiling face of the roof portion of the body 1. The slide plate 13 is provided with transverse slots 16 which are equal in number to the rows of the perforations 12 and of a width corresponding to the length of the perforations. The slots are spaced apart a distance corresponding to the spacing of the rows so that when the slide plate is positioned with the slots registering with the perforations there will be no obstruction with regard to the openings provided by the perforations. The slide plate is capable of being moved longitudinally a distance equal to the length of the elongated perforations 12 so that it will assume a position in which the perforations are entirely covered in order to shut off flow of air into the interior of the body 1. On the other hand the slide plate may be adjusted to partly cover the openings to an extent desired in accordance with the amount of fresh air to be admitted.

The actuating means for the perforated control plate 13 is shown as an eccentric device, comprising an eccentric bearing plate or disc 16a seated in a circular recess in the apertured bottom wall 15 of the distributor and provided with an eccentric pin 17 which is engaged in the transversely extending slot 18 supplied in an end part of the slide plate 13. A knob 19 is made fast on a shaft portion of the eccentric device 16a and is located below the bottom wall 15 of the distributor so as to be within easy reach of an occupant of the motor car.

According to this arrangement the knob is turned to positionally adjust the slide plate for covering and uncovering the openings in the bottom plate 15 of the distributor.

Figure 2:
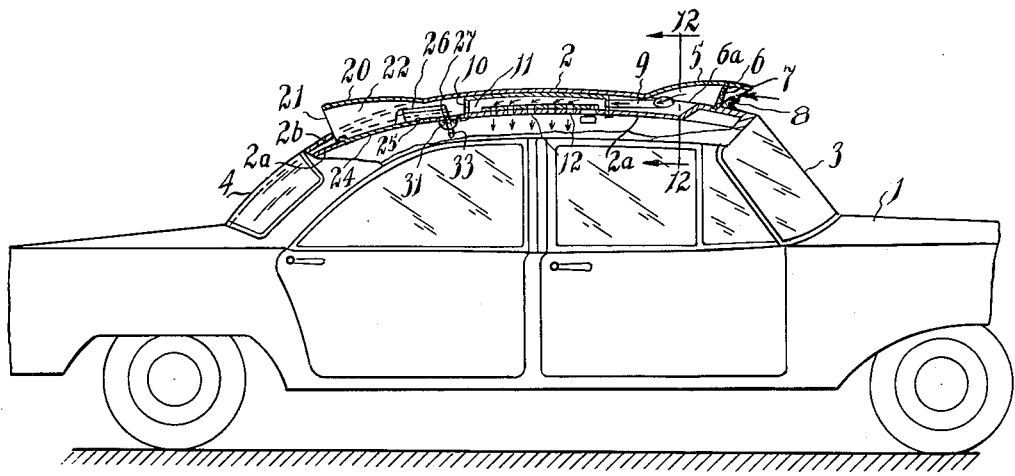
FIG. 2 is a side elevation of the automobile with the roof broken away in section along the plane of line 2—2 of FIG. 1, to more clearly depict the ventilating system of the present invention.

From the preceding description it will be manifest that the invention provides an air ventilating system in which fresh air is introduced into the interior of the motor vehicle in accordance with the requirements of the occupants and this is brought about by control of the openings in the bottom plate of the distributor. Referring to FIGS. 1 and 2, the illustrated ventilating system is of particular advantage when applied to a car top or roof which is characterized by an air space such as 2b between a ceiling wall 2a and the roof wall 2. This is so because some air from scoop 6 is free to circulate directly rearwardly between the entry ends of the ducts 9, 9 and between the distributors 10, 10 to the rear hood outlets 20 to thus tend to rapidly cool said ceiling and roof walls proper. Also some air from roof wall opening 6a will be deflected to opposite sides of air space 2b by the inwardly inclined forward ends of ducts 9, 9. However, there will be an ample passenger compartment air supply to the rearwardly opening inlets of ducts 9 adjacent opposite sides of the rear end of scoop 6. And finally, it will be clear from FIG. 2 that when the car is moving forwardly, the suction created in hood passages 22, which communicate with the rear end of air space 2b, will draw air from the air space 2b for discharge through the rear ends of hoods 20.

Vitiated air is discharged from a rear portion of the roof and to this end there is provided a hood generally denoted at 20 which hood rises from the outer face of the roof and sweeps upwardly to a point short of the window 4 where it provides an outlet opening indicated at 21. The opening 21 faces the rear of the motor vehicle and terminates in a passage supplied by the hood which passage is indicated at 22. Passage 22 has an inlet opening leading to the interior of the body 1 and the inlet opening is denoted at 23. A damper 24 controls this inlet opening and is shown as hinged at 25 to swing upwardly into the passage in an opening operation.

The damper plate 4 has a control device for manual operation, although it is to be understood that the damper may be otherwise controlled if so desired.

By way of example but not of limitation the control device for the damper plate comprises a rod 26 pivoted at an end to the damper plate and likewise connected at its other end as at 27 to a hand lever 28 projecting through a slot 29 into the interior of the body 1 so that it may be reached by an occupant of the vehicle. The handle lever 28 is pivoted at 30 and there is supplied a cooperating indexing quadrant 31 for maintaining the handle lever in any position to which it is set. This is effected by a nodule 32 on the hand lever which is selectively engageable in any one of a series of indents 33 supplied in the quadrant plate 31 and arranged in an arc of a circle as best shown in FIG. 8. The hand lever is lightly tensioned against the quadrant plate as by spring pressure in approved manner.

Forward travel of the vehicle will induce air to enter the scoop more or less under pressure and, aside from the ventilation of the roof and ceiling wall-provided air space 2b, as aforementioned, it will be conducted to the distributors which will discharge it into the interior of the vehicle body provided the slide plate is in an open or partially open condition. The amount of air admitted will depend of course upon the position of the slide plate and the inflow may be entirely shut off by simply closing the slide plate. Vitiated air will be discharged through the hood when the damper plate is opened or in a partly opened condition. The arrangement enables the interior of the body 1 to be maintained in a well ventilated condition without drafts and in a degree compatible to the occupants. The novel construction and arrangement of the ventilating system herein disclosed obviates undesirable drafts depending upon the opening of a window or a window ventilator of the ordinary type. A desirable feature is that it serves to keep the windows from becoming frosted in the winter and provides a system which is flexible of control and inexpensive to install in a motor vehicle. It will be obvious that one or more of the air discharge hoods may be employed according to the dictates of manufacture and likewise any number of distributors may be employed and these may be arranged in a hollow wall element of the car body other than the roof portion if so desired. These and other modifications may be resorted to as coming within the scope of the invention as defined in the ensuing claims.

What I claim is:

1. In a top for the closed or sedan type automobile or the like providing transversely spaced roof and ceiling walls of stiff material defining an air space therebetween, which air space, as usual, is substantially coextensive in length and width with said top, the improvement which comprises providing said roof wall with a forwardly located air inlet opening at approximately its longitudinal center and also with two rearwardly located air outlet openings located one adjacent each of said roof wall sides, said inlet and outlet openings communicating with said air space, protective forward and rear hoods overlying the respective roof wall-provided openings, each of said rear hoods opening rearwardly and having side walls and one end wall connected to related edges of the associated roof wall-provided opening, the forward inlet opening hood being an upward and functionally integral roof wall-provided bulge opening forwardly and providing rearwardly and inwardly tapering top and side walls, the ceiling wall of said top having a cutout at each side rearwardly of the air inlet opening and forwardly of the related air outlet openings, said cutouts terminating short of the adjacent side of said ceiling wall and also short of the longitudinal center of the latter, a casing fitting snugly into each of said cutouts, each casing providing an endless side and end-providing wall and also top and bottom walls with the top wall disposed contiguous to the opposed inner surface of said roof wall; means securing each of said casings to said ceiling wall whereby they act as supporting spacers between the ceiling and roof walls, each of said casings having an air inlet in its forward end wall, forwardly and inwardly inclined conduits in said air space and providing forward inlet ends, said conduits having rear ends communicating with the respective casing-provided air inlets, the forward conduit-provided inlet ends terminating in said air space below the rear end of said roof wall-provided air inlet opening and adjacent opposite sides of the latter, said conduit inlet ends being disposed at least partly contra to the path of air travel into said air space from said forward hood and the subjacent roof wall-provided air inlet opening, whereby said conduits receive and supply a portion of the incoming air to the related casings and a portion to said roof and ceiling wall-provided air space so as to cool the latter, manually operable air outlet means in each of the bottom casing walls for the discharge of air into the passenger compartment of the vehicle, said ceiling wall having a separate air exit opening rearwardly of each of said casings and communicating with the air space from the passenger compartment, said ceiling wall-provided air exit openings substantially aligned with the respective roof wall-provided outlet openings, and manually operable valve means controlling said ceiling wall-provided air exit openings from said passenger compartment.

2. The structure of claim 1, and the inclined forwardly facing sides of said conduits deflecting incoming air from said roof wall-provided inlet opening to opposite sides of said air space.

References Cited in the file of this patent

UNITED STATES PATENTS

| | | |
|---|---|---|
| 1,740,626 | Petrelli | Dec. 24, 1929 |
| 1,982,747 | Kurth | Dec. 4, 1934 |
| 2,232,108 | Giacomini | Feb. 18, 1941 |
| 2,523,104 | Emmert | Sept. 19, 1950 |
| 2,550,353 | Hopfinger | Apr. 24, 1951 |
| 2,758,533 | Hill | Aug. 14, 1956 |

FOREIGN PATENTS

| | | |
|---|---|---|
| 477,633 | Great Britain | Jan. 4, 1938 |